United States Patent
Boland

(10) Patent No.: US 8,402,595 B2
(45) Date of Patent: Mar. 26, 2013

(54) WINDSCREEN WIPER DEVICE COMPRISING AN ELASTIC, ELONGATED CARRIER ELEMENT, AS WELL AS AN ELONGATED WIPER BLADE OF A FLEXIBLE MATERIAL, WHICH CAN BE PLACED IN ABUTMENT WITH THE WINDSCREEN TO BE WIPED

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 213 days.

(21) Appl. No.: 12/936,240

(22) PCT Filed: Mar. 31, 2009

(86) PCT No.: PCT/EP2009/053837
§ 371 (c)(1), (2), (4) Date: Dec. 27, 2010

(87) PCT Pub. No.: WO2009/121896
PCT Pub. Date: Oct. 8, 2009

(65) Prior Publication Data
US 2011/0107543 A1    May 12, 2011

(30) Foreign Application Priority Data
Apr. 4, 2008    (EP) .................................. 08103394

(51) Int. Cl.
*B60S 1/38*    (2006.01)
(52) U.S. Cl. ............ 15/250.43; 15/250.361; 15/250.201
(58) Field of Classification Search ............. 15/250.361, 15/250.43, 250.44, 250.201, 250.451–250.454
See application file for complete search history.

(56) References Cited

U.S. PATENT DOCUMENTS
| | | | | |
|---|---|---|---|---|
| 2,983,945 A | * | 5/1961 | De Pew | 15/250.452 |
| 3,626,544 A | * | 12/1971 | Lopez et al. | 15/250.361 |
| 2007/0061993 A1 | | 3/2007 | Lee | |

FOREIGN PATENT DOCUMENTS
| | | | |
|---|---|---|---|
| DE | 10245693 A1 | | 4/2004 |
| DE | 102005052258 A1 | | 5/2007 |
| EP | 1491416 | * | 12/2004 |
| EP | 1683695 A | | 7/2006 |
| EP | 1695881 A | | 8/2006 |
| FR | 2281858 A | | 3/1976 |
| JP | 2007-216735 | * | 8/2007 |
| WO | WO 2007/031260 A | | 3/2007 |

* cited by examiner

*Primary Examiner* — Gary Graham
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart-longitudinal strips of the carrier element are disposed, wherein neighboring ends of the longitudinal strips are interconnected by a respective connecting piece, which windscreen wiper device comprises a connecting device for an oscillating wiper arm wherein the strips; and the connecting piece are slidably connected by means of a snap connection with the interposition of a joint part.

9 Claims, 7 Drawing Sheets

WINDSCREEN WIPER DEVICE COMPRISING AN ELASTIC, ELONGATED CARRIER ELEMENT, AS WELL AS AN ELONGATED WIPER BLADE OF A FLEXIBLE MATERIAL, WHICH CAN BE PLACED IN ABUTMENT WITH THE WINDSCREEN TO BE WIPED

BACKGROUND OF THE INVENTION

1. Technical Field

The invention relates to a windscreen wiper device of the type having an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of the longitudinal strips are interconnected by a respective connecting piece, which windscreen wiper device comprises a connecting device for an oscillating wiper arm.

2. Related Art

Such a windscreen wiper device is generally known. The prior art windscreen wiper device is in particular designed as a "yokeless" wiper device or "flat blade", wherein use is no longer made of several yokes pivotally connected to each other, but wherein the wiper blade is biased by the carrier element, as a result of which it exhibits a specific curvature.

In practice it is felt that, the plastic connecting pieces (in practice also called "end caps") can be easily damaged, for example when a person smashes the wiper blade onto the windscreen to be wiped with a considerable force in an attempt to wipe of any snow on the wiper blade.

SUMMARY OF THE INVENTION AND ADVANTAGES

An object of the invention is to improve the prior art as indicated above, in particular to provide a windscreen wiper device, wherein the longitudinal strips and the connecting pieces ("end caps") are interconnected in a durable, solid manner, and wherein the connecting pieces are less vulnerable in the sense that they can withstand large forces applied thereon.

In order to accomplish that objective, a windscreen wiper device of the kind referred to in the introduction is characterized in that the strips and the connecting piece are slidably connected by means of a snap connection with the interposition of a joint part, the joint part is particularly a separate constructional element that can be inserted into the connecting piece in order to reinforce the connecting piece.

In one preferred embodiment of a windscreen wiper device in accordance with the invention the joint part comprises engaging members engaging around the longitudinal strips so that the strips are mounted in grooves formed by the engaging members.

In another preferred embodiment of a windscreen wiper device in accordance with the invention the snap connection comprises laterally extending means on the strips, wherein the laterally extending means comprise at least one protrusion extending laterally from an interior edge of each strip, the protrusion being located within the outer contour of each strip and between stops on the joint part. Particularly, a moulding operation would ensure that the stop(s) can be formed in a reliable and controllable manner, without high costs as far as additional tools and equipment are concerned.

In another preferred embodiment of a windscreen wiper device according to the invention the joint part comprises a channel for a part of the wiper blade that extends from the strips in a direction away from the windscreen to be wiped, wherein the channel comprises retaining means for retaining the joint part onto the wiper blade.

In another preferred embodiment of a windscreen wiper device in accordance with the invention the retaining means comprise at least one downwardly extending gripping tooth for gripping the part of the wiper blade extending from the strips in a direction away from the windscreen to be wiped. Preferably, the gripping tooth is cut from an upper wall of the channel and bent inwardly away from the upper wall towards the windscreen to be wiped. Particularly, the retaining means comprise an end wall of the channel, so that any (whether or not allowed) longitudinal movement of the wiper blade relative to the joint part is blocked by the end wall.

In another preferred embodiment of a windscreen wiper device according to the invention the connecting piece and the joint part are slidably connected by means of a snap connection.

Preferably, the snap connecting comprises laterally extending means on the connecting piece, wherein the laterally extending means comprise at least one protrusion extending laterally from an inner wall of the connecting piece, the protrusion being located between stops on the joint part.

In another preferred embodiment of a windscreen wiper device in accordance with the invention the joint part and the engaging members are made in one piece of metal.

THE DRAWINGS

The invention will now be explained in more detail with reference to figures illustrated in a drawing, wherein.

DETAILED DESCRIPTION

Figure 1:
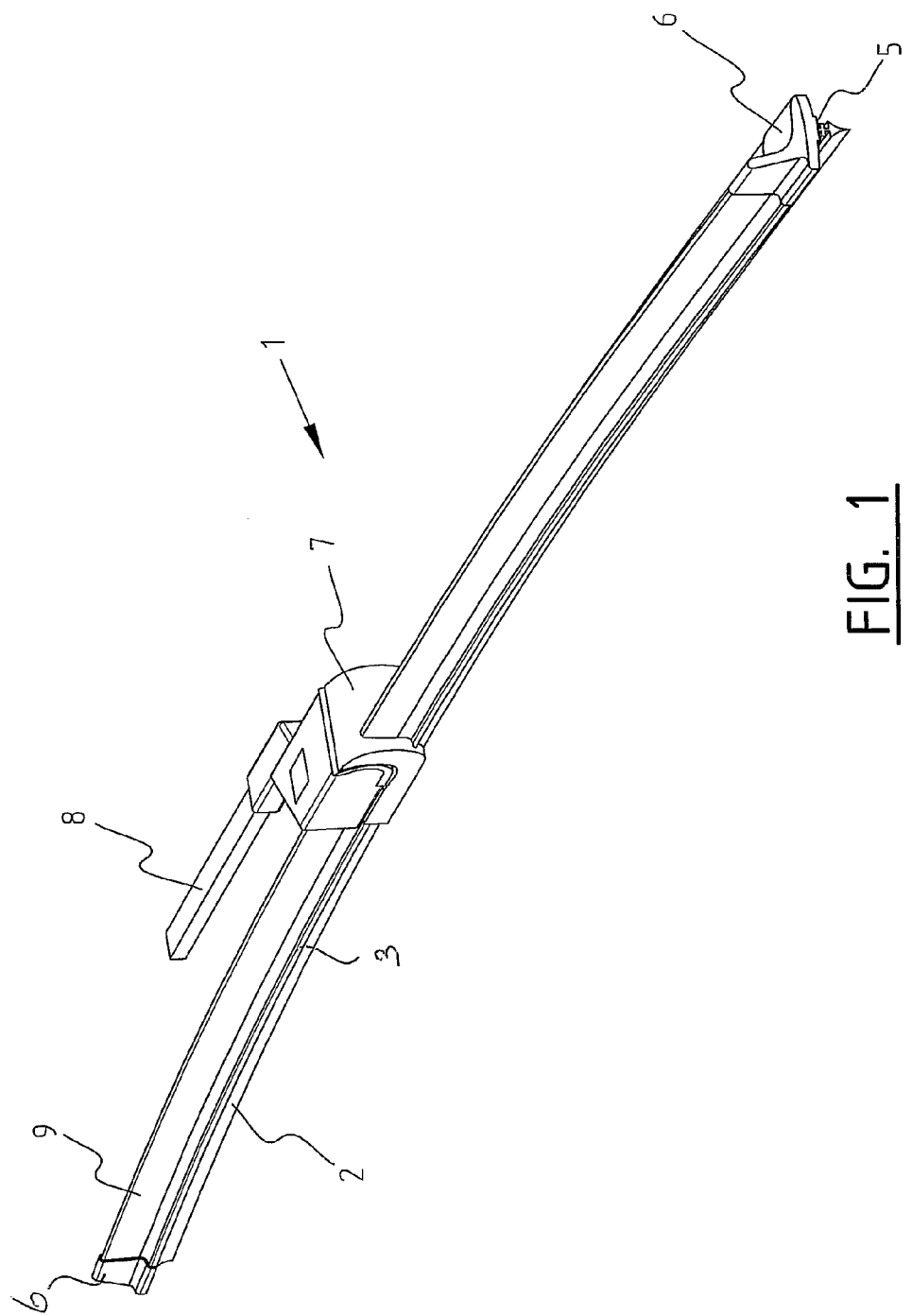
FIG. 1 is a perspective, schematic view of a preferred embodiment of a windscreen wiper device according to the invention.
Figure 7:
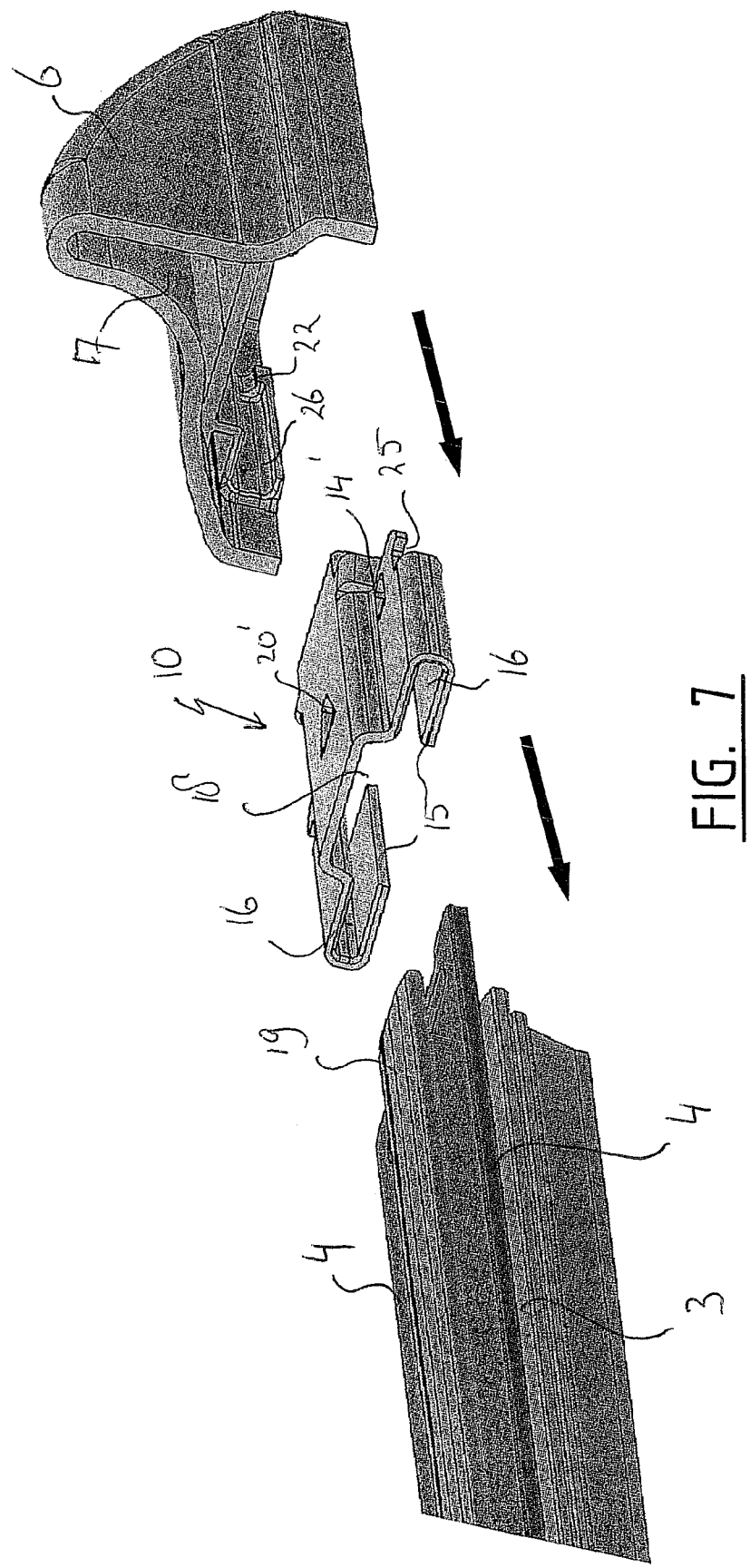

FIG. 1 shows a preferred variant of a windscreen wiper device 1 according to the invention, the windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3 (FIG. 7), the strips 4 form a flexible carrier element for the rubber wiper blade 2, as it were, which is thus biased in a curved position (the curvature in operative position being that of a windscreen to be wiped). Neighboring ends 5 of strips 4 are interconnected on either side of the windscreen wiper device 1 by means of plastic connecting pieces 6 being separate constructional elements. The windscreen wiper device 1 is further equipped with a connecting device 7 for an oscillating arm 8, and a spoiler 9.

Figure 2:
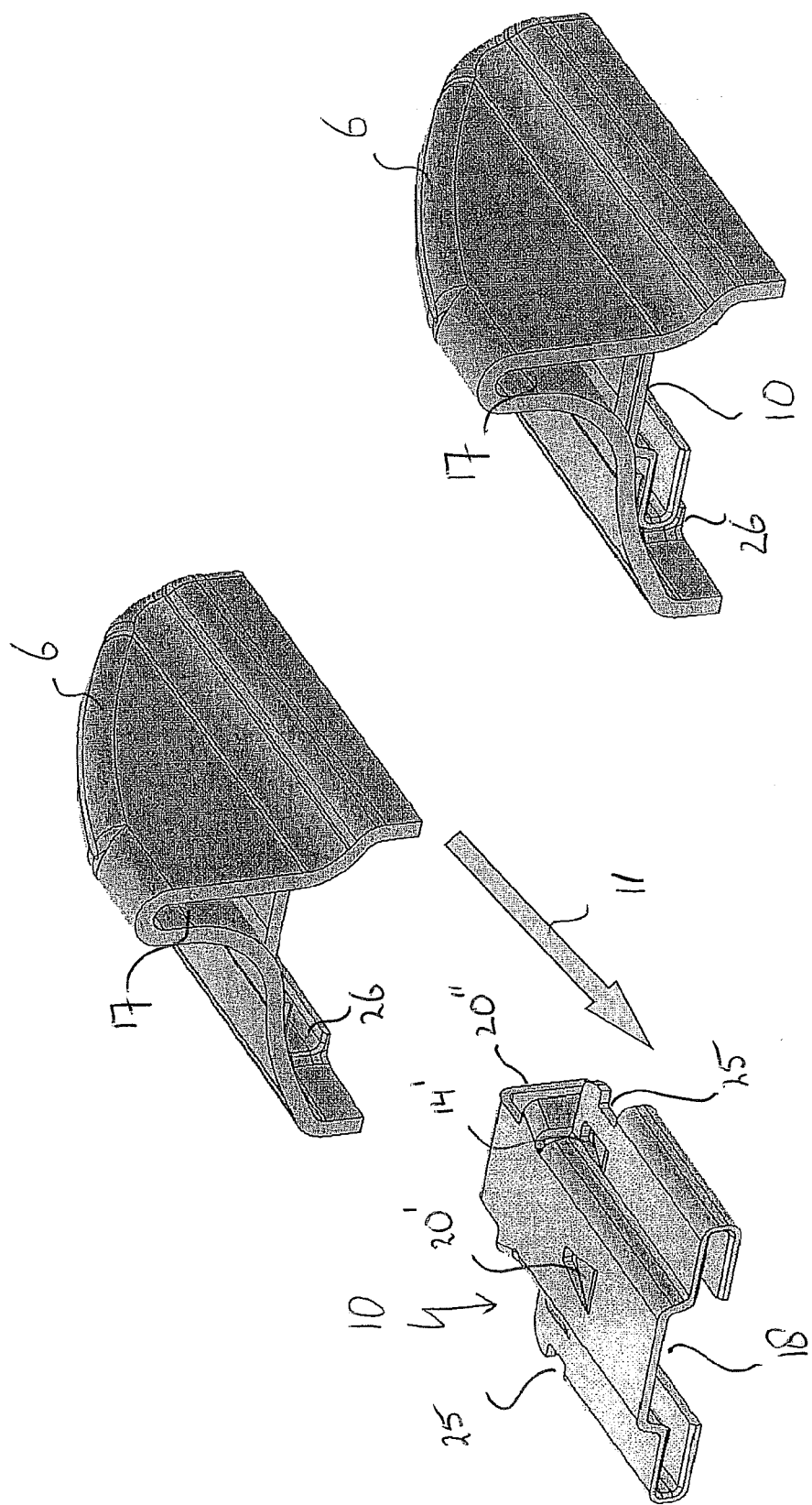
FIGS. 2 through 7 show details of the windscreen wiper device of FIG. 1.

FIG. 2 shows on the left hand how one of the connecting pieces 6 and a metal joint part 10 can be slidably connected through a snap connection in the direction of the arrow 11, whereas FIG. 2 reveals on the right hand the connecting piece 6 and the joint part 10 in assembled position.

Figure 6:
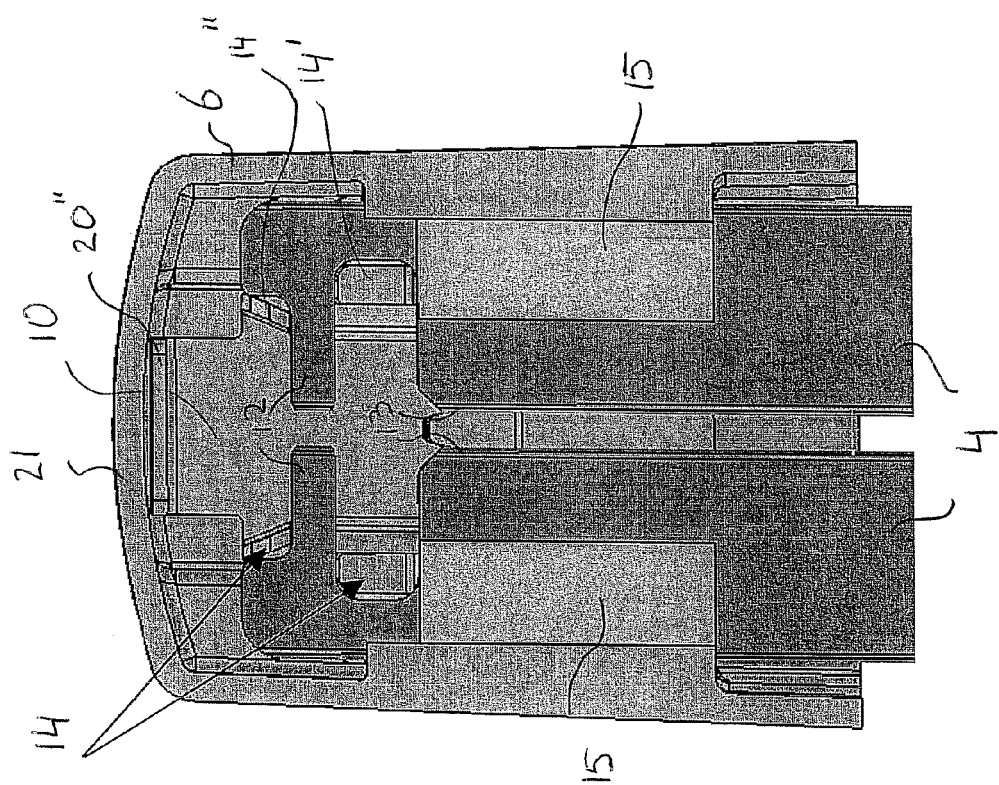
Figure 6:
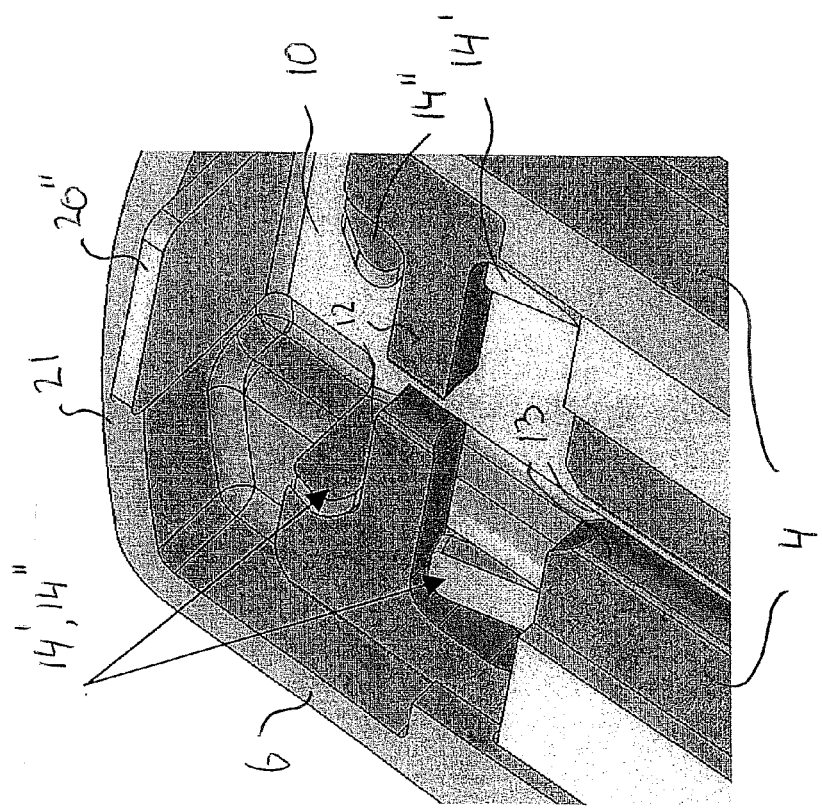

With reference to FIG. 6 relating to a bottom view of the strips 4, the connecting piece 6 and the joint part 10 in assembled position (while the wiper blade 2 being absent), the strips 4 are each provided with a protrusion 12 extending laterally from a longitudinal interior edge 13 of the strips 4.

When a connecting piece 6 is slidably mounted onto the joint part 10 and subsequently onto the neighboring ends 5 of the strips 4, a snap or clicking connection is realized, wherein the protrusions 12 are snapped or clicked between stops 14',14" ("notches 14") inside the joint part 10. Each protrusion 1 rests in a small groove between these opposing stops 14',14". Accordingly, the strips 4 are blocked against any movement in longitudinal direction with respect to the connecting pieces 6/joint parts 10. Each joint part 10 is also provided with two engaging members 15 made integral therewith, wherein the engaging members 15 engage around the strips 4 so as to form a groove 16 for sliding the strips 4 therein, the engaging members 15 ensure that the strips 4 are blocked against any movement in transversal direction with respect to the connecting pieces 6/joint parts 10. The stop 14' facing away from the free end of the connecting piece 6 is equipped with an inclined upper surface, so that sliding the joint part 10 onto the strips 4 does not take too much force, whereas once the protrusion 12 rests inside the groove dismounting the joint part 10 from the strips 4 cannot take place easily. The stop 14" facing towards the free end of the connecting piece 6 also ensures that the strips are kept at a mutual constant distance, as the upper end of each strip 4 is located between the stop 14" and a (side) wall of the connecting piece 6 (FIG. 6). Each connecting piece 6 has a cavity 17 to accommodate the free end of the spoiler 9.

Figure 3:
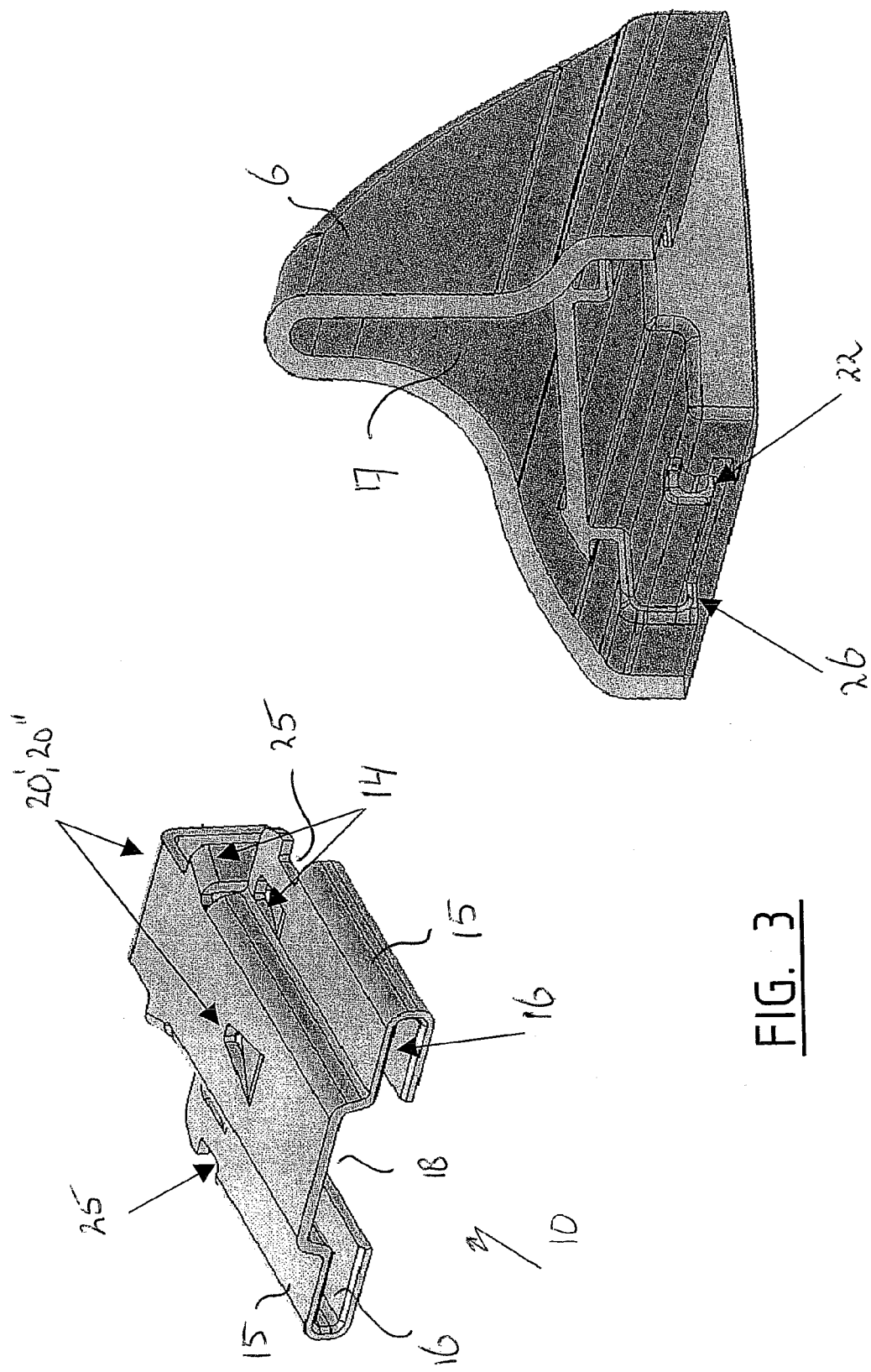
Figure 4:
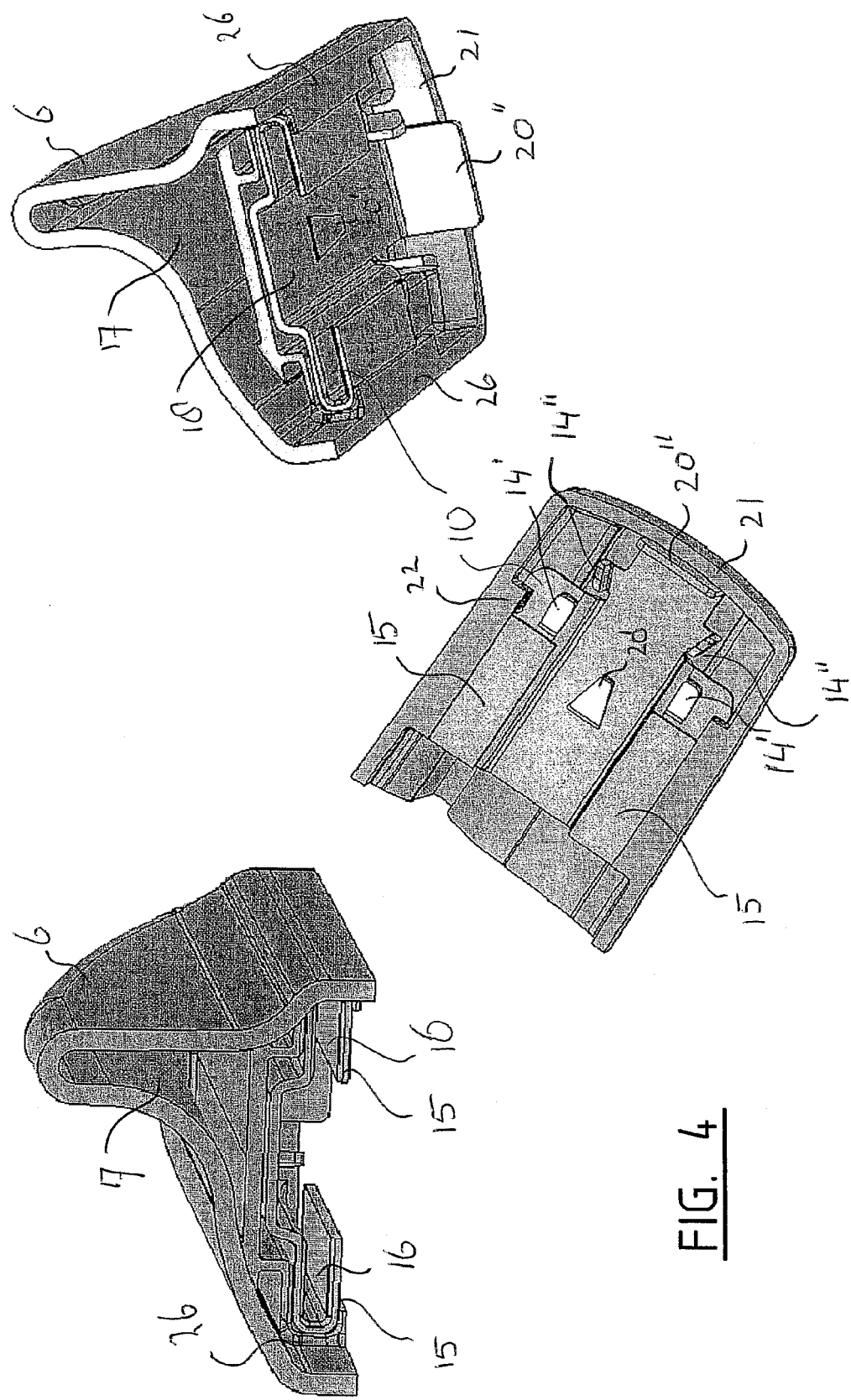

As can be seen from FIGS. 2 through 7, the joint part 10 comprises a channel 18 for a part 19 of the wiper blade 2 that extends from the strips 4 in a direction away from the windscreen to be wiped, the channel 18 comprises retaining means in the form of a downwardly extending gripping tooth 20' for gripping the part 19 of the wiper blade 2 for retaining the joint part 10 onto the wiper blade 2, the gripping tooth 20' is cut from an upper wall of the channel and bent inwardly away from the upper wall towards the windscreen to be wiped, the retaining means also comprises an end wall 20" of the channel 18. In practice the end wall 20" may abut against an end wall 21 of the connecting piece 6 (FIGS. 4 and 6).

Figure 5:
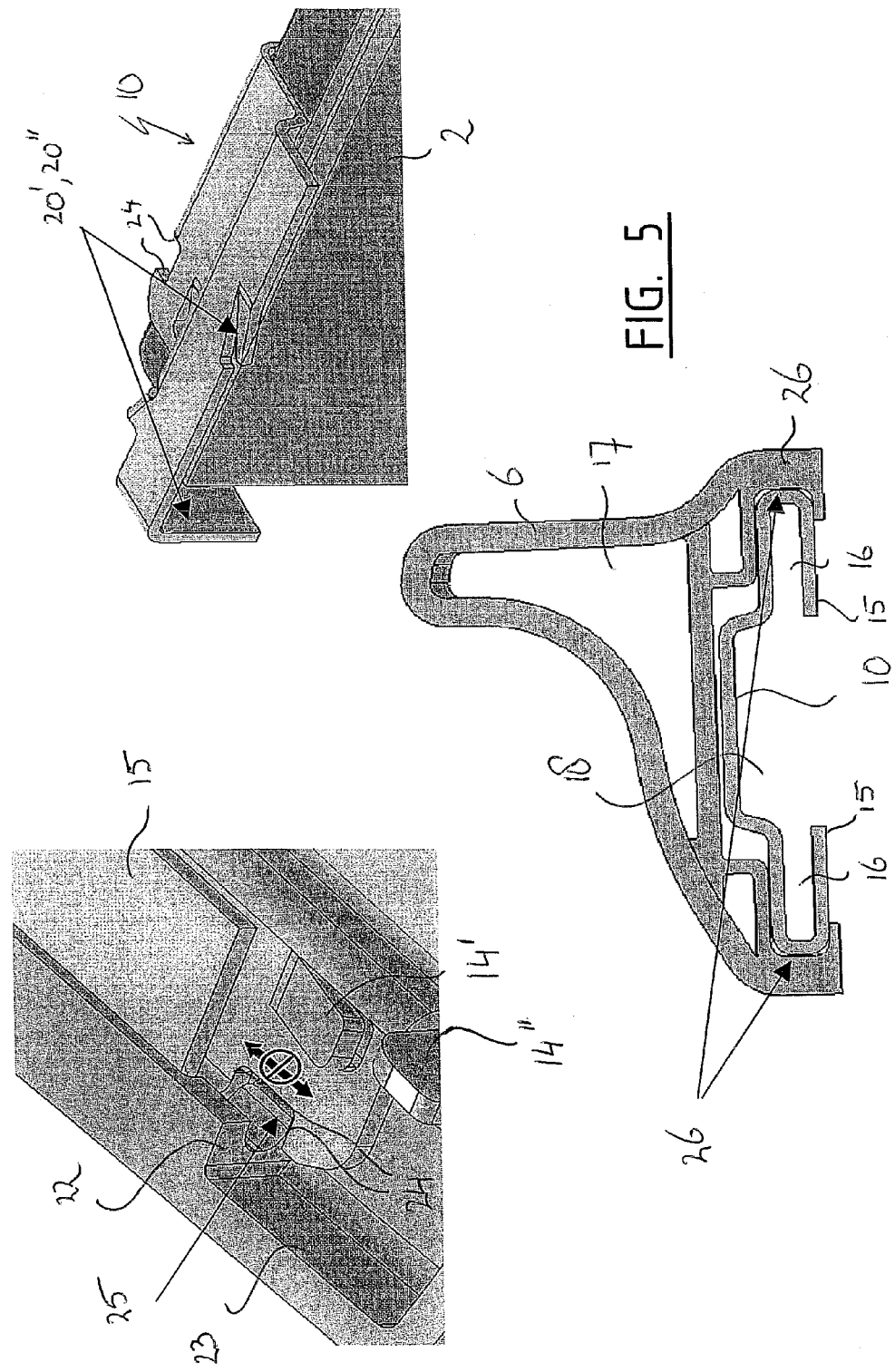

Referring to FIGS. 3 and 5 the connecting piece 6 and the joint part 10 are slidably connected by means of a snap connection also, wherein the snap connecting comprise a protrusion 22 extending laterally from an inner wall 23 of the connecting piece 6, the protrusion 22 being located between stops 24 on the joint part 10, the stops 24 may be formed by the transverse surfaces of a recess 25 inside the joint part 10.

Each connecting piece 6 is provided by downwardly extending arms 26 in one piece therewith for engaging the joint part 10. Free ends of the arms 26 extend inwardly so as to engage the joint part 10 in a firm manner.

The present invention is not limited to the embodiment shown, but extends also to other embodiments falling within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of said longitudinal strips are interconnected by a respective connecting piece, which windscreen wiper device comprises a connecting device for an oscillating wiper arm, wherein said strips and said connecting piece are slidably connected by means of a snap connection with the interposition of a joint part, and the snap connection comprises laterally extending features on said strips, and wherein said laterally extending features comprise at least one protrusion extending laterally from an interior edge of each strip, said protrusion being located within the outer contour of each strip and between stops on the joint part.

2. A windscreen wiper device according to claim 1, wherein said joint part comprises engaging members engaging around the longitudinal strips so that said strips are mounted in grooves formed by said engaging members.

3. A windscreen wiper device according to claim 2, wherein said joint part comprises a channel for a part of said wiper blade that extends from said strips in a direction away from the windscreen to be wiped, and wherein said channel comprises retaining structure for retaining said joint part onto said wiper blade.

4. A windscreen wiper device according to claim 3, wherein said retaining structure comprises at least one downwardly extending gripping tooth for gripping said part of said wiper blade extending from said strips in a direction away from the windscreen to be wiped.

5. A windscreen wiper device according to claim 4, wherein said gripping tooth is cut from an upper wall of said channel and bent inwardly away from said upper wall towards the windscreen to be wiped.

6. A windscreen wiper device according to claim 2, wherein said joint part and said engaging members are made in one piece of metal.

7. A windscreen wiper device according to claim 3, wherein said retaining structure comprises an end wall of said channel.

8. A windscreen wiper device according to claim 1, wherein said connecting piece and said joint part are slidably connected by means of a snap connection.

9. A windscreen wiper device according to claim 8, wherein said snap connect ion comprises at least one protrusion extending laterally from an inner wall of said connecting piece, said protrusion being located between stops on the joint part.

* * * * *